United States Patent
Cody et al.

(10) Patent No.: US 11,782,599 B1
(45) Date of Patent: Oct. 10, 2023

(54) VIRTUAL MOUSE FOR ELECTRONIC TOUCHSCREEN DISPLAY

(71) Applicants: Roya Cody, Markham (CA); Che Yan, Toronto (CA); Da Yuan Huang, Markham (CA); Wei Li, Markham (CA)

(72) Inventors: Roya Cody, Markham (CA); Che Yan, Toronto (CA); Da Yuan Huang, Markham (CA); Wei Li, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/944,338

(22) Filed: Sep. 14, 2022

(51) Int. Cl.
*G06F 3/04886* (2022.01)
*G06F 3/04845* (2022.01)

(52) U.S. Cl.
CPC ...... *G06F 3/04886* (2013.01); *G06F 3/04845* (2013.01); *G06F 2203/04808* (2013.01)

(58) Field of Classification Search
CPC ........ G06F 3/0484; G06F 3/012; G06F 3/013; G06F 3/0486; G06F 3/011; G06F 3/0481; G06F 3/04812; G06F 3/04815; G06F 3/0488; G06F 3/03543; G06F 11/3684; G06F 11/3688; G06F 13/102; G06F 3/0213; G06F 3/0354; G06F 3/038; G06F 3/0383; G06F 3/0428; G06F 3/04847; G06F 3/06; G06F 9/4411; G06F 9/451; G06F 40/169; G06F 1/3203; G06F 1/3231; G06F 1/324; G06F 1/3259; G06F 3/04886; G06F 1/1692; G06F 16/9537; G06F 2203/0333; G06F 3/03547
See application file for complete search history.

(56) References Cited

U.S. PATENT DOCUMENTS

| | | | |
|---|---|---|---|
| 2006/0209021 A1* | 9/2006 | Yoo | G06F 3/0304 345/156 |
| 2010/0149104 A1* | 6/2010 | Sim | G06F 1/1692 345/169 |
| 2010/0214218 A1* | 8/2010 | Vaisanen | G06F 3/0488 345/173 |
| 2010/0302155 A1* | 12/2010 | Sands | G06F 3/04886 345/173 |
| 2014/0225857 A1* | 8/2014 | Ma | G06F 3/0418 345/174 |
| 2015/0212698 A1* | 7/2015 | East | G06F 3/0488 715/856 |

OTHER PUBLICATIONS

Kim, Sunjun, and Geehyuk Lee. "Tapboard 2: Simple and effective touchpad-like interaction on a multi-touch surface keyboard." Proceedings of the 2016 CHI Conference on Human Factors in Computing Systems. 2016.

(Continued)

*Primary Examiner* — Rayeez R Chowdhury

(57) ABSTRACT

Systems and methods are disclosed for providing a virtual mouse for a computing device have a touchscreen. A first placement region of the touchscreen may be determined. The first placement region may then be determined to contain a first portion of at least one touch target. The first portion of the at least one touch target may then be deactivated. A virtual mouse may then be activated at the first placement region.

20 Claims, 13 Drawing Sheets

(56) References Cited

OTHER PUBLICATIONS

Fitzmaurice, George, et al. "Tracking menus." Proceedings of the 16th annual ACM symposium on User interface software and technology. 2003.
Findlater, Leah, Ben Lee, and Jacob Wobbrock. "Beyond QWERTY: augmenting touch screen keyboards with multitouch gestures for non-alphanumeric input." Proceedings of the SIGCHI Conference on Human Factors in Computing Systems. 2012.
Shi, Yilei, et al. "Gestakey: Touch interaction on individual keycaps." Proceedings of the 2018 CHI Conference on Human Factors in Computing Systems. 2018.
Mysliwiec, Thomas A. "Fingermouse: A freehand computer pointing interface." in Proc. of Int'l Conf. on Automatic Face and Gesture Recognition. 1994.
Habib, Iman, et al. "Dgts: Integrated typing and pointing." IFIP Conference on Human-Computer Interaction. Springer, Berlin, Heidelberg, 2009.
Parsoya, Arihant, and Venkatesh Rajamanickam. "KeySlide: using directional gestures on keyboard for cursor positioning." Proceedings of the 10th Indian Conference on Human-Computer Interaction. 2019.
Leah Findlater et al, Beyond QWERTY: Augmenting Touch-Screen Keyboards with Multi-Touch Gestures for Non-Alphanumeric Input, Session: Touch Text Entry, CHI 2012, May 5 10, 2012, Austin, Texas, USA, 4 pages.
Iman Habib et al, DGTS: Integrated Typing and Pointing, T. Gross et al. (Eds.): INTERACT 2009, Part II, LNCS 5727, pp. 232 235, 2009, 4 pages.
Thomas A. Mysliwiec, FingerMouse: A Freehand Computer Pointing Interface, Vision Interfaces and Systems, Laboratory Technical Report, VISLab-94-001, Oct. 1994, 12 pages.
Yilei Shi et al, GestAKey: Touch Interaction on Individual Keycaps, CHI 2018, Apr. 21 26, 2018, Montr al, QC, Canada, CHI 2018 Paper, 12 pages.
Arihant Parsoya et al, KeySlide: Using Directional Gestures on Keyboard for Cursor Positioning, India HCI 2019, Nov. 1 3, 2019, Hyderabad, India, 11 pages.
Sunjun Kim et al, TapBoard 2: Simple and Effective Touchpad like Interaction on a Multi Touch Surface Keyboard, CHI"16, May 7-12, 2016, San Jose, CA, USA, 6 pages.
George Fitzmaurice et al, Tracking Menus, UIST 03 Vancouver, BC, Canada, 2003, 11 pages.

\* cited by examiner

VIRTUAL MOUSE FOR ELECTRONIC TOUCHSCREEN DISPLAY

FIELD

This disclosure relates generally to electronic touchscreen devices, and more specifically to systems and methods for providing a virtual mouse thereupon.

BACKGROUND

A physical keyboard and a physical mouse are well-established components for interacting with computing devices such as smartphones, tablets, laptop computers, desktop computers, smart watches, etc. While effective, the physical keyboard, mouse, and associated computer accessories (e.g. cables, etc.) can both limit the portability of a computing device and provide points of failure to the operation of the computing device.

An increasing number of computing devices are being produced having a touchscreen display, and the touchscreen display has emerged as a desirable means for interacting with these computing devices. In some instances, the touchscreen display may operate to provide a virtual keyboard, and may eliminate the requirement for a physical keyboard when using an associated computing device. In some instances, the touchscreen display may operate to provide a virtual mouse, and may eliminate the requirement for a physical mouse when using an associated computing device.

It is desirable to provide improvements to how a virtual mouse can be provided by a touchscreen display.

SUMMARY

In many existing approaches, the use of a touchscreen display as both a virtual keyboard and a virtual mouse contemporaneously has been problematic. Many available solutions do not allow the touchscreen display to be used as both a virtual keyboard and a virtual mouse at the same time, and may require an explicit mode switching interaction to switch from one to the other. Furthermore, many available solutions are application-specific and do not generalize to a system-level solution.

In various examples, the present disclosure presents a virtual mouse having a minimal touchscreen footprint. Unlike other approaches, embodiments of a virtual mouse described herein do not require the exclusive occupation of a portion of a touchscreen. As a result, while the virtual mouse is in operation, the overall use of the touchscreen is maximized.

Moreover, embodiments described herein provide for the contemporaneous use of the virtual mouse and a larger touch target occupying at least part of the same touchscreen location. For example, the virtual mouse may occupy the same location of the touchscreen as a portion of a virtual keyboard, and the virtual mouse and the remaining portion of the virtual keyboard may be used contemporaneously, avoiding explicit mode-switching between virtual input devices.

Examples disclosed herein provide for efficient, single-handed, user-initiated control and maintenance of the virtual mouse directly via the touchscreen, and do not require the use of a separate physical device to perform such actions. Examples disclosed herein may further provide for a virtual mouse which may be operated in a manner which mimics that of a physical mouse.

In some embodiments, the present disclosure describes a virtual mouse which may dynamically adapt to the size of a user's hand, providing additional ease of use.

Embodiments described herein provide for a virtual mouse that may provide system level cursor control and may be operated globally, across multiple applications, providing a system level solution that is not application specific.

Embodiments described herein describe an assistive widget which provides for the activation and deactivation of the virtual mouse and/or other virtual input devices in a manner that is accessible to the neophyte.

Aspects of the present disclosure may be adaptable to a variety of touchscreen sensing technologies. A physical mouse may receive and interpret a number of gestures, including click, drag and scroll gestures. In some cases, these gestures may be performed using a left mouse button and/or a right mouse button. Examples of the present disclosure may enable user interactions that are commonly performed using a physical mouse to be carried out using a virtual mouse.

In accordance with one aspect of the present disclosure, there is provided a computer system comprising a touchscreen; a processor; and a memory coupled to the processor, the memory storing instructions which, when executed by the processor, cause the system to deactivate a first portion of an at least one touch target; and activate the virtual mouse at a first placement region of the touchscreen for a virtual mouse, wherein the first placement region contains the first portion of the at least one touch target. Optionally, before deactivating a first portion of an at least one touch target, further to determine a first placement region of the touchscreen for a virtual mouse.

In some implementations, the system is further caused to detect dual drag input via the virtual mouse. The dual drag input may correspond to a contemporaneous movement of a first finger touchscreen location and a second finger touchscreen location. The contemporaneous movement may comprise a movement of the first finger touchscreen location from an initial first finger touchscreen location within the first placement region to a subsequent first finger touchscreen location, and to a movement of the second finger touchscreen location from an initial second finger touchscreen location within the first placement region to a subsequent second finger touchscreen location. The system may be further caused to determine a second placement region of the touchscreen for the virtual mouse. The second placement region may correspond to the subsequent first finger touchscreen location and the subsequent second finger touchscreen location. The system may be further caused to reactivate the first portion of the at least one touch target; and activate the virtual mouse at the second placement region.

In some implementations, the system is further caused to prior to activating the virtual mouse at the second placement region, determine that the second placement region contains a second portion of the at least one touch target; and deactivate the second portion of the at least one touch target.

In some implementations, prior to the determination of the first placement region, the system is further caused to detect a multi-finger gesture at an initial first finger touchscreen location and an initial second finger touchscreen location. The determination of the first placement region may further cause the system to determine that the first placement region corresponds to the initial first finger touchscreen location and the initial second finger touchscreen location.

In some implementations, the first placement region for the virtual mouse encompasses the initial first finger touchscreen location and the initial second finger touchscreen location.

In some implementations, a size of the first placement region is proportional to a distance between the initial first finger touchscreen location and the initial second finger touchscreen location.

In some implementations, a size of the virtual mouse at the first placement region is proportional to the size of the first placement region.

In some implementations, the at least one touch target is a virtual keyboard.

In some implementations, the system is further caused to detect a cessation of a touch input via the virtual mouse; determine that a time period has elapsed; and deactivate the virtual mouse.

In some implementations, the touchscreen displays an assistive widget, and wherein prior to determining the first placement region, the system is further caused to detect a single finger drag of the assistive widget; determine that the assistive widget has reached an edge region of the touchscreen; and responsive to determining that the assistive widget has reached the edge region of the touchscreen, determine the first placement region to be at aa default location.

In some implementations, the system is further caused to detect a touch input via the assistive widget; and in response to detecting the touch input via the assistive widget, deactivate the virtual mouse.

In accordance with another aspect of the present disclosure, there is provided a method for providing a virtual mouse on a touchscreen. The touchscreen may display at least one touch target. The method may comprise deactivating a first portion of an at least one touch target; and activating the virtual mouse at an first placement region, wherein the first placement region contains the first portion of the at least one touch target. Optionally, before deactivating, further comprising: determining a first placement region of the touchscreen for a virtual mouse; determining that the first placement region contains a first portion of the at least one touch target.

In some implementations, the method further comprises detecting dual drag input via the virtual mouse. The dual drag input may correspond to a contemporaneous movement of a first finger touchscreen location and a second finger touchscreen location. The contemporaneous movement may comprise a movement of the first finger touchscreen location from an initial first finger touchscreen location within the first placement region to a subsequent first finger touchscreen location, and to a movement of the second finger touchscreen location from an initial second finger touchscreen location within the first placement region to a subsequent second finger touchscreen location. The method may further comprise determining a second placement region of the touchscreen for the virtual mouse. The second placement region may correspond to the subsequent first finger touchscreen location and the subsequent second finger touchscreen location. The method may further comprise reactivating the first portion of the at least one touch target; and activating the virtual mouse at the second placement region.

In some implementations, the method further comprises: prior to activating the virtual mouse at the second placement region, determining that the second placement region contains a second portion of the at least one touch target; and deactivating the second portion of the at least one touch target.

In some implementations, the method further comprises: prior to determining the first placement region, detecting a multi-finger gesture at the initial first finger touchscreen location and the initial second finger touchscreen location; and wherein determining the first placement region includes determining that the first placement region corresponds to the initial first finger touchscreen location and the initial second finger touchscreen location.

In some implementations, the first placement region surrounds the initial first finger touchscreen location and the initial second finger touchscreen location.

In some implementations, a size of the first placement region is proportional to a distance between the initial first finger touchscreen location and the initial second finger touchscreen location.

In some implementations, a size of the virtual mouse at the first placement region is proportional to the size of the first placement region.

In some implementations, the at least one touch target is a virtual keyboard.

In accordance with yet another aspect of the present disclosure, there is provided a non-transitory computer-readable medium having machine-executable instructions stored thereon. The machine-executable instructions, when executed by a processor of a device, cause the device to determine a first placement region of a touchscreen for a virtual mouse; determine that the first placement region of the touchscreen contains a first portion of an at least one touch target; deactivate the first portion of the at least one touch target; and activate the virtual mouse at the first placement region.

BRIEF DESCRIPTION OF THE DRAWINGS

Reference will now be made, by way of example, to the accompanying drawings which show example embodiments of the present disclosure, and in which.

DETAILED DESCRIPTION

In various examples, the present disclosure describes intuitive, simplistic, mode switching for virtual input devices, such as virtual keyboards, virtual mice, virtual trackpads, and the like. Embodiments described herein allow a user to quickly activate and deactivate both a virtual keyboard and a virtual mouse, in a space-efficient, intuitive, user-friendly manner.

In some implementations, systems and methods described herein provide for the use of gestures and/or an assistive widget to activate a virtual mouse that will mimic the operation of a physical mouse. The virtual mouse may operate contemporaneously with other virtual input devices, such as virtual keyboards.

Embodiments described herein may operate on a variety of touchscreen devices, such as dual screen laptops, foldable laptops, standard laptops, tablets, smart phones, and the like.

In this disclosure the term "computing system" refers to an electronic device having computing capabilities. Examples of computing systems include but are not limited to: personal computers, laptop computers, tablet computers ("tablets"), smartphones, surface computers, augmented reality gear, automated teller machines (ATM)s, point of sale (POS) terminals, and the like.

In this disclosure, the term "display" refers to a hardware component of an electronic device that has a function of displaying graphical images, text, and video content thereon. Non-limiting examples of displays include liquid crystal displays (LCDs), light-emitting diode (LED) displays, and plasma displays.

In this disclosure, a "screen" refers to the outer user-facing layer of a touchscreen display.

In this disclosure, the terms "touchscreen element" and "touchscreen" refer to a combination of a display together with a touch sensing system that is capable of acting as an input device by receiving a touch input. Non-limiting examples of touchscreen displays are: capacitive touchscreens, resistive touchscreens, and Infrared touchscreens and surface acoustic wave touchscreens.

In this disclosure, the term "main viewing area" or "main view" refers to the single viewing area that covers all or substantially all (e.g., greater than 95%) of the viewable area of an entire display area of a touchscreen display.

In this disclosure, the term "application" refers to a software program comprising of a set of instructions that can be executed by a processing device of an electronic device.

In this disclosure, the terms "top", "bottom", "right", "left", "horizontal" and "vertical" when used in the context of viewing areas of a display are relative to the orientation of the display when content currently displayed on the display is presented in an orientation that the content is intended to be viewed in.

In this disclosure, the term "touchscreen device" refers to a computer system having a touchscreen element.

In this disclosure, the term "touch target" refers to a part of a touchscreen that responds to user input.

Figure 1:
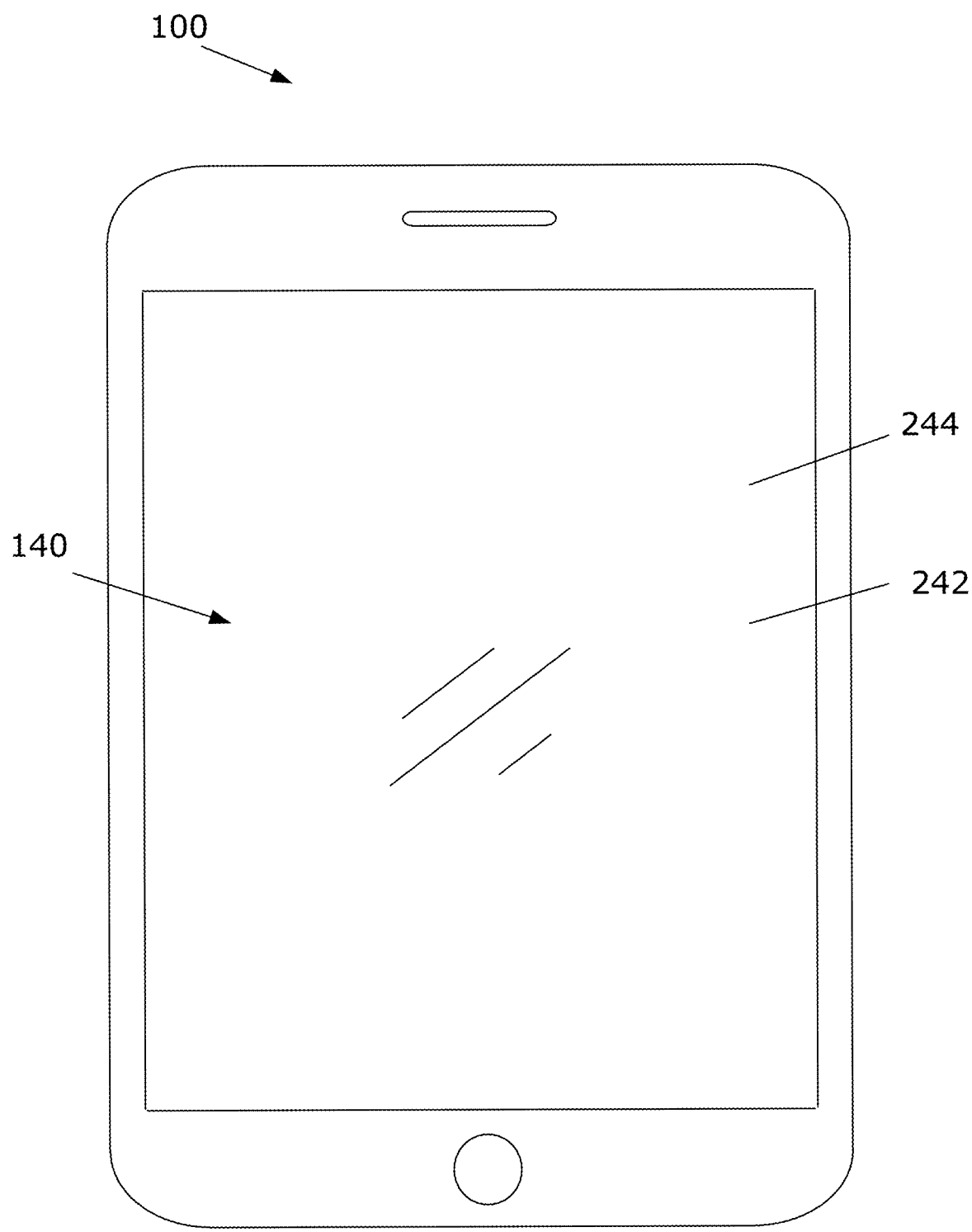
FIG. 1 depicts an example touchscreen device, in accordance with examples of the present disclosure.

FIG. 1 depicts an example touchscreen device 100, which is an example operating environment of an example embodiment. As shown, the touchscreen device 100 includes a touchscreen element 140. The touchscreen element includes a touch panel 244 (an input device) and a display 242 (an output device). As such, the touchscreen element 140 may be operable to render content and to sense touch thereupon. As noted, the touchscreen element 140 may also be described as a touchscreen 140. The touchscreen 140 may implement one or more touchscreen technologies. For example, the touchscreen 140 may be a Resistive Film touchscreen, a Surface Capacitive touchscreen, a Projective Capacitive touchscreen, a Surface Acoustic Wave (SAW) touchscreen, an Optical touchscreen, an Electromagnetic touchscreen, etc.

Although FIG. 1 illustrates a tablet, the touchscreen device 100 may be a smartphone, a laptop, and/or other similar electronic device. The touchscreen device 100 may be a type of computer system within the scope of the present disclosure.

Figure 2:
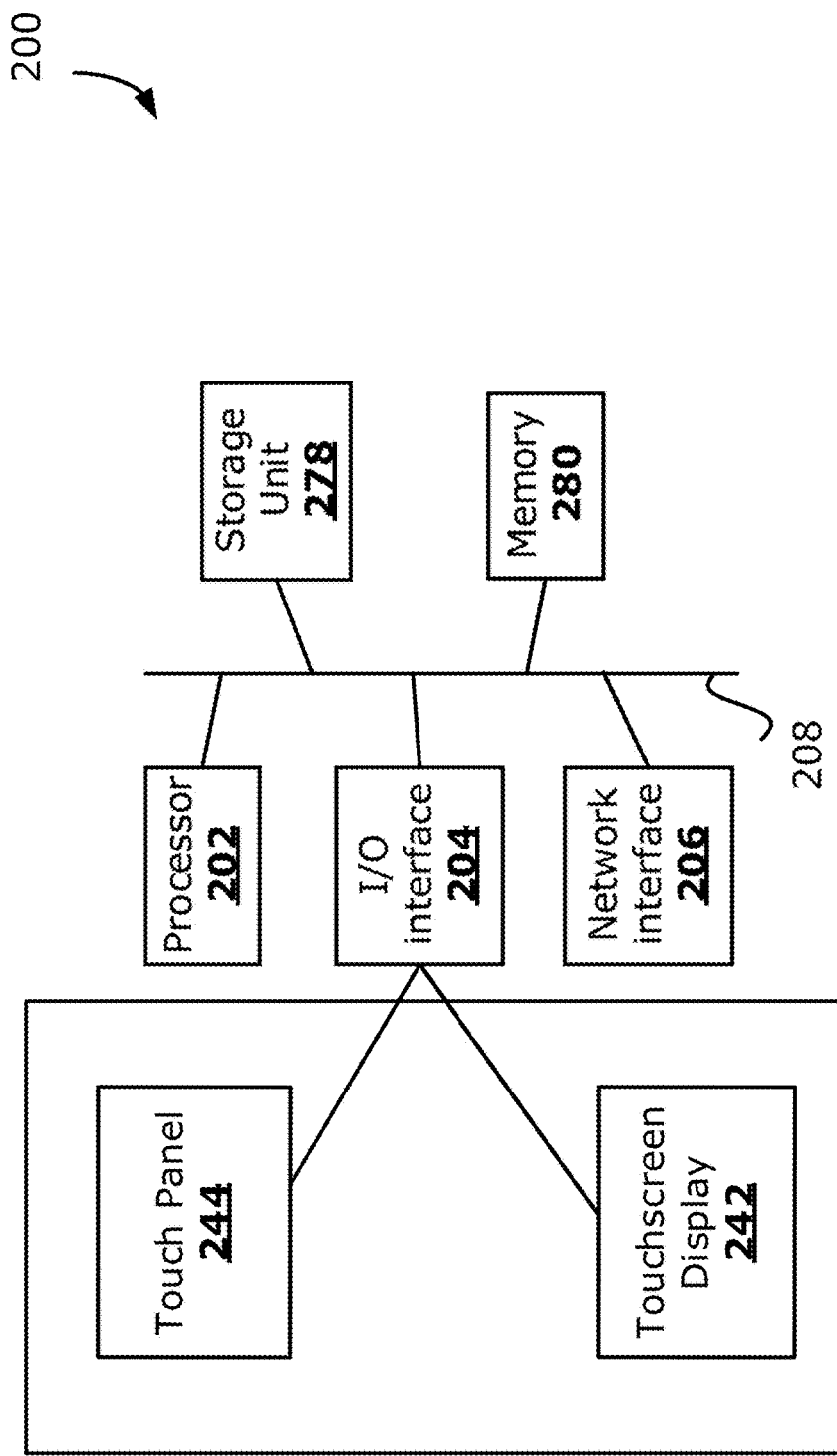
FIG. 2 is a high-level operation diagram of an example computing system, in accordance with examples of the present disclosure.

FIG. 2 is a high-level operation diagram of an example computing system 200, in accordance with embodiments of the present disclosure. In at least some embodiments, the example computing system 200 may be exemplary of the touchscreen device 100 (FIG. 1), and is not intended to be limiting.

The example computing system 200 includes a variety of components. For example, as illustrated, the example computing system 200 may include a processor 202, an input/output (I/O) interface 204, a network interface 206, a storage unit 278 and a memory 280. As illustrated, the foregoing example components of the computing system 200 are in communication over a bus 208. The bus 208 is shown providing communication among the components of the computing system 200. The bus 208 may be any suitable bus architecture including, for example, a memory bus, a peripheral bus or a video bus.

The processor 202 may include one or more processors, such as a microprocessor, a microcontroller, an application-specific integrated circuit (ASIC), a field-programmable gate array (FPGA), a dedicated logic circuitry, or combinations thereof.

The network interface 206 may include one or more network interfaces for wired or wireless communication with a network (e.g., an intranet, the Internet, a peer-to-peer (P2P) network, a wide area network (WAN) and/or a local area network (LAN) or other node. The network interface 206 may include wired links (e.g., Ethernet cable) and/or wireless links (e.g., one or more antennas) for intra-network and/or inter-network communications.

The storage unit 278 may be one or more storage units, and may include a mass storage unit such as a solid state drive, a hard disk drive, a magnetic disk drive and/or an optical disk drive.

The (I/O) interface 204 may be one or more I/O interfaces, and may enable interfacing with one or more appropriate input devices, such as the touch panel 244, and/or one or more appropriate output devices, such as the touchscreen display 242. As previously described, the touch panel 244 and the touchscreen display 242 may form part of the touchscreen element 140.

The touch panel 244 may include a variety of touch sensors for sensing touch input, which may depend on the touch sensing modality used by the touchscreen element 140 (e.g., resistive sensors, capacitive sensors, SAW devices, optical sensors, electromagnetic sensors, etc.). Additionally, the touch panel 244 may include one or more force sensors. A force sensor may be any sensor capable of detecting applied force.

The computing system 200 may include one or more memories 280, which may include a volatile (e.g. random access memory (RAM)) and non-volatile or non-transitory memories (e.g., a flash memory, magnetic storage, and/or a read-only memory (ROM)). The non-transitory memory(ies) of memories 280 store programs that include software instructions for execution by the processor 202, such as to carry out examples described in the present disclosure. In example embodiments, the programs include software instructions for implementing an operating system (OS) and software applications.

In some examples, the memory 280 may include software instructions of the computing system 200 for execution by the processor 202 to carry out the operations described in this disclosure. In some other examples, one or more data sets and/or modules may be provided by an external memory (e.g., an external drive in wired or wireless communication with the computing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Figure 3:
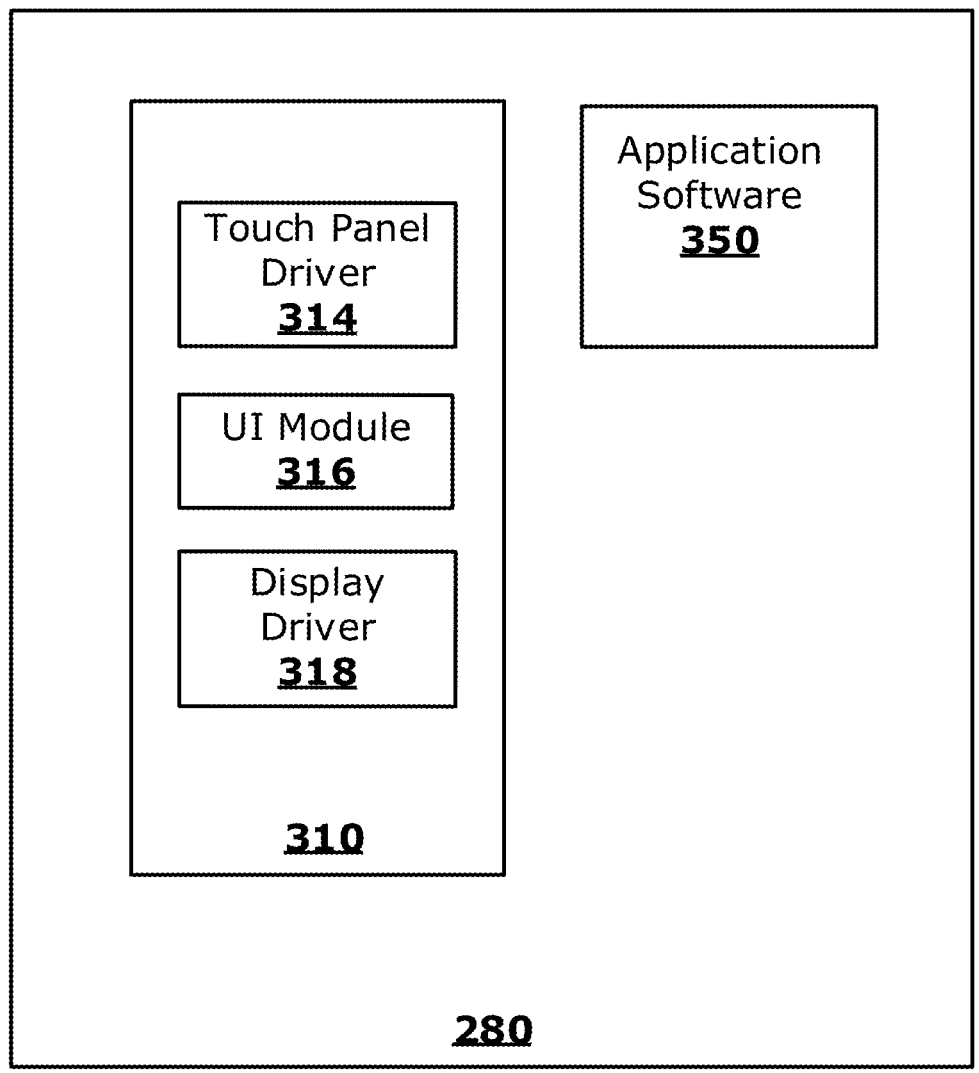
FIG. 3 is a simplified organization of software components, in accordance with examples of the present disclosure.

FIG. 3 depicts a simplified organization of software components that may be stored in memory 280 of the example computing system 200 (FIG. 2). As illustrated, these software components include application software 350 and an operating system (OS) 310.

The application software 350 adapts the example computing system 200 (FIG. 2), in combination with the OS 310, to operate as a device performing a particular function. For example, the application software 350 may render content on the touchscreen display 242 (FIG. 2) via the display driver 318. For example, the application software 350 may sense touch upon the touch panel 244 (FIG. 2) via the touch panel driver 314. In some embodiments, the application software 350 may comprise a virtual input devices application.

The OS 310 is software. The OS 310 allows the application software 350 to access the processor 202, the memory 280, the I/O interface component 204, the network interface 206, and the storage unit 278 (FIG. 2). The operating system 310 may be, for example, Apple™ iOS™, Android™, Microsoft™ Windows™, Google™ ChromeOS™, or the like.

The OS 310 includes a variety of modules. For example, as illustrated, the OS 310 may include a touch panel driver 314, a User Interface (UI) module 316, and a display driver 318. The touch panel driver 314, may, as discussed above, couple with the touch panel 244 (FIG. 2) to generate touch events. The UI module 316, may operate to recognize gestures formed by the touch events. The display driver 318 may, as discussed above, couple with the touchscreen display 242 (FIG. 2) to provide for content rendering on the touchscreen display 242 (FIG. 2).

Figure 4:
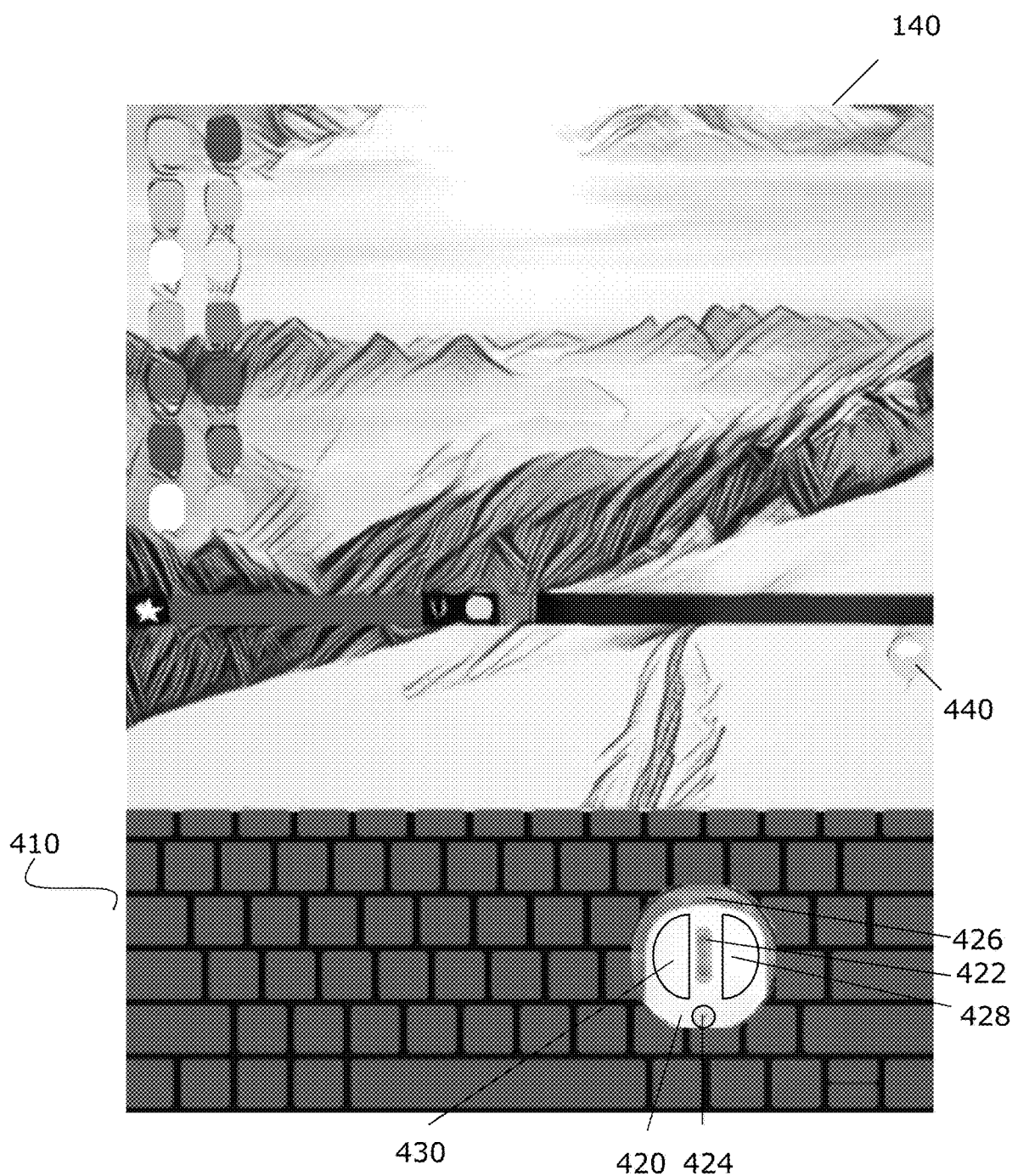
FIG. 4 is a first depiction of a touchscreen element displaying rendered content, in accordance with examples of the present disclosure.

FIG. 4 is a first depiction of a touchscreen element 140 displaying rendered content including an example virtual keyboard 410 and an example virtual mouse 420, in accordance with an embodiment of the present disclosure. The touchscreen element 140 may be operable to render content and to sense touch thereupon. As noted, the touchscreen element 140 may also be described as a touchscreen 140.

The example virtual mouse 420 includes a virtual left mouse button 430, a virtual right mouse button 428, a virtual scroll wheel 422, and a virtual anchor button 424. The virtual mouse 420 may be translucent, as shown. The virtual anchor button 424 may operate to turn on and to turn off the virtual mouse 420. The virtual left mouse button 430, the virtual right mouse button 428, and the virtual scroll wheel 422 may operate together and independently of one another to execute various functions of the virtual mouse 420.

A placement region 426 encompasses the virtual mouse 420. The placement region 426 identifies the area of rendered content that has been temporarily deactivated due to the virtual mouse being displayed (e.g., as an overlay on the rendered content). In the example of FIG. 4, the placement region 426 identifies the area of the virtual keyboard 410 that has been temporarily deactivated due to the virtual mouse being displayed. This may give an appearance that the virtual keyboard 410 is beneath the virtual mouse 420. Notably, the remainder of the virtual keyboard 410 remains contemporaneously operable together with the virtual mouse 420. The placement region 426 may move together with the virtual mouse 420 as the virtual mouse 420 moves across the virtual keyboard and/or across the entirety of the touchscreen element 140.

The touchscreen element 140 also displays an assistive widget 440. The assistive widget 440 is operable to launch an shortcut menu (not shown), which is a menu providing means for interacting with the virtual keyboard 410, the virtual mouse 420, and other rendered content of the touchscreen 140, etc.

In some embodiments, the assistive widget 440 may be used to activate a virtual mouse 420. For example, in some embodiments, by performing a defined touch gesture, such as dragging two fingers over the assistive widget 440, or by using one finger to drag the assistive widget 440 to an edge region of the touchscreen, such as a side edge region of the touchscreen, a virtual mouse 420 may be activated. In some such embodiments, when the virtual mouse 420 is activated in response to user interaction with the assistive widget 440, the virtual mouse 420 may be activated to a default location.

In some embodiments, the assistive widget 440 may be used to activate a virtual keyboard 410. For example, in some embodiments, by performing a defined touch gesture, such as using one finger to drag the assistive widget 440 to a bottom edge of the touchscreen, a virtual keyboard 410 may be activated.

In some embodiments, the assistive widget 440 may be used to activate a last used input device and/or a user preferred (e.g., based on a predefined user preference) input device. For example, in some embodiments, a predefined touch gesture such as single tap upon the assistive widget 440 may activate a last used input device and/or a user preferred input device. The last used input device and/or a user preferred input device may be the virtual mouse 420 or the virtual keyboard 410.

In some embodiments, the assistive widget 440 may be used to deactivate the virtual mouse 420. For example, in some embodiments, a touch input upon the assistive widget 440 may deactivate the virtual mouse 420. The touch input may be, for example a double tap.

Figure 5:
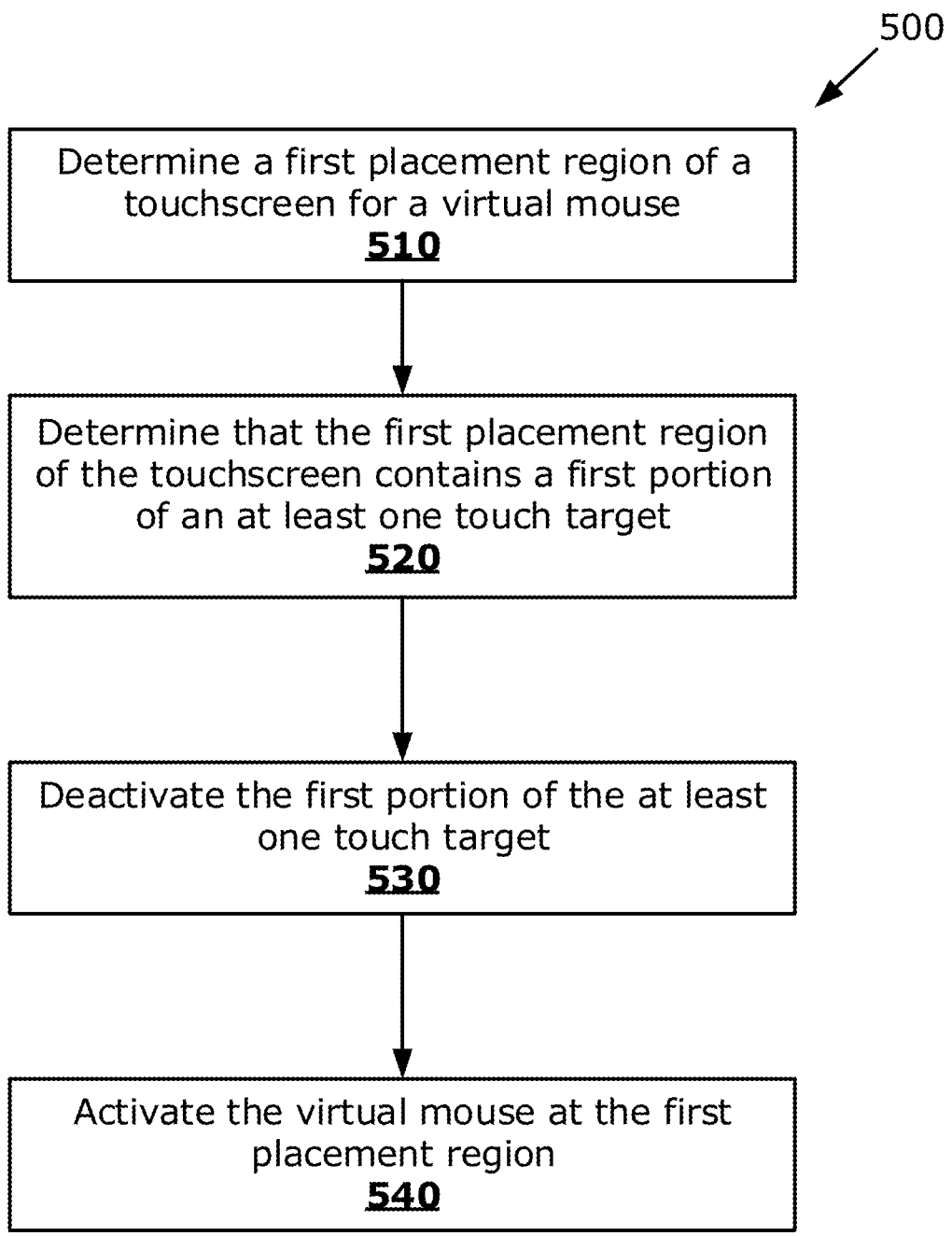
FIG. 5 is a flowchart of an example method of determining a first placement region of a touchscreen for a virtual mouse, in accordance with examples of the present disclosure.

FIG. 5 is a flowchart of an example method 500 of determining a first placement region of a touchscreen for a virtual mouse, in accordance with an aspect of the present disclosure. The method 500 may be performed by one or more processors of a computing system (e.g., the computing system 200 of FIG. 2). Specifically, the operations 510 and onward may be performed by one or more processors of a touch screen device.

At operation 510, the system determines a first placement region of a touchscreen for a virtual mouse. The determination may be made in a variety of ways. For example, in some implementations, the system may detect a multi-finger gesture at an initial first finger touchscreen location and an initial second finger touchscreen location (which may correspond to an initial placement of a user's index and middle fingers, for example), and the system may determine the first placement region to correspond to the initial first finger touchscreen location and an initial second finger touchscreen location.

In some embodiments, the particular gesture that may cause the system to determine the first placement region may vary depending upon the content rendered at the location of the touchscreen corresponding to the gesture. For example, at a location of the touchscreen rendering a virtual keyboard, any two finger gesture may cause the system to determine the first placement region. As another example, at a location of the touchscreen rendering a display region, a two finger long press may cause the system to determine the first placement region.

In some embodiments, the initial first finger touchscreen location and the initial second finger touchscreen location may correspond to locations of the two fingers executing the two finger gesture. In some embodiments, the system may determine the first placement region to encompass the initial first finger touchscreen location and the initial second finger touchscreen location.

In some implementations, the system may determine the first placement region to be a default location of the touchscreen. For example, in some implementations, the touchscreen may display an assistive widget, and the system may detect a single finger drag of the assistive widget. The system may subsequently detect that the assistive widget has reached an edge region of the touchscreen. As a result of detecting a single finger drag of the assistive widget to an edge of the touchscreen, the system may determine that the first placement region is a default location.

In some embodiments, the determination of the first placement region may include the determination of the size of the first placement region, and the size of the first placement region may vary. For example, in implementations where a two-finger gesture causes the system to determine the first placement region, the size of the first placement region may correspond to the relative positions of the initial first finger touchscreen location and the initial second finger touchscreen location. For example, in some implementations, the size of the first placement region may be proportional to a distance between the initial first finger touchscreen location and the initial second finger touchscreen location. Notably, in this way, the size of the first placement region may vary in accordance with the relative size of the hand of a user.

Figure 6:
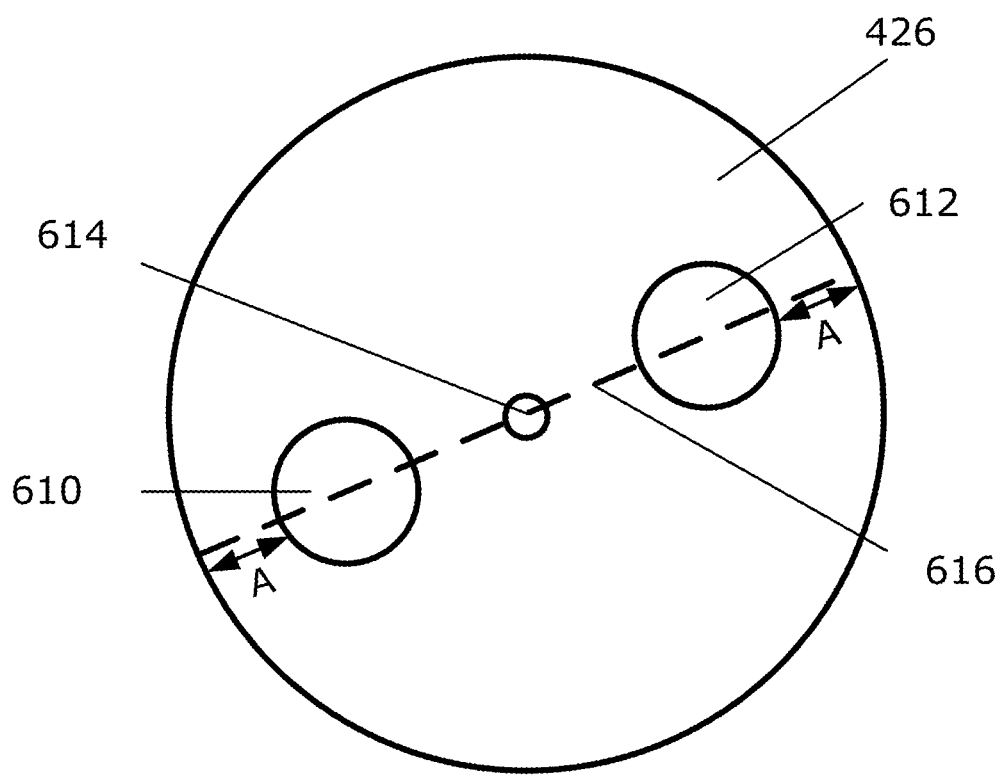
FIG. 6 is a schematic diagram of a placement region, in accordance with examples of the present disclosure

Reference is made to FIG. 6, which is a schematic diagram of a placement region 426, in accordance with aspects of the present disclosure. The placement region 426, a first finger touchscreen location 610 and a second finger touchscreen location 612 are represented as discs, and the first finger touchscreen location 610 and the second finger touchscreen location 612 are depicted within the placement region 426. An axis 616 bisects the placement region 426, the first finger touchscreen location 610 and the second finger touchscreen location 612, and a mouse center location 614 is determined as a midpoint on the axis 616 between the first and second finger touchscreen locations 610, 612.

In some implementations, as shown in FIG. 6, a distance A extends along the axis 616 from the first finger touchscreen location 610 to a point on the edge of the placement region 426, and from the second finger touchscreen location 612 to another point on the edge of the placement region 426. The distance A represents a margin for error tolerance that may be determined by the system in determining the placement region 426.

It will be noted that the placement region 426 is designed to encompass a virtual mouse (not shown), and that the size of the virtual mouse may be proportional to the size of the placement region 426. During use of the virtual mouse, the distance between the first finger touchscreen location 610 and the second finger touchscreen location 612 may vary (e.g., as a result of the user shifting their fingers on the touchscreen 140). As a result, the size of the virtual mouse and the size of the placement region 426 may dynamically adapt to the distance between the first finger touchscreen location 610 and the second finger touchscreen location 612 during use of the mouse.

Returning to the method 500 of FIG. 5, after the operation 510, the operation 520 is next.

At the operation 520, the system determines that the first placement region 426 of the touchscreen contains a first portion of an at least one touch target. A touch target is an element displayed by a touchscreen that a user may click, touch, or otherwise interact with, such as a virtual button or a virtual keyboard.

Figure 7:
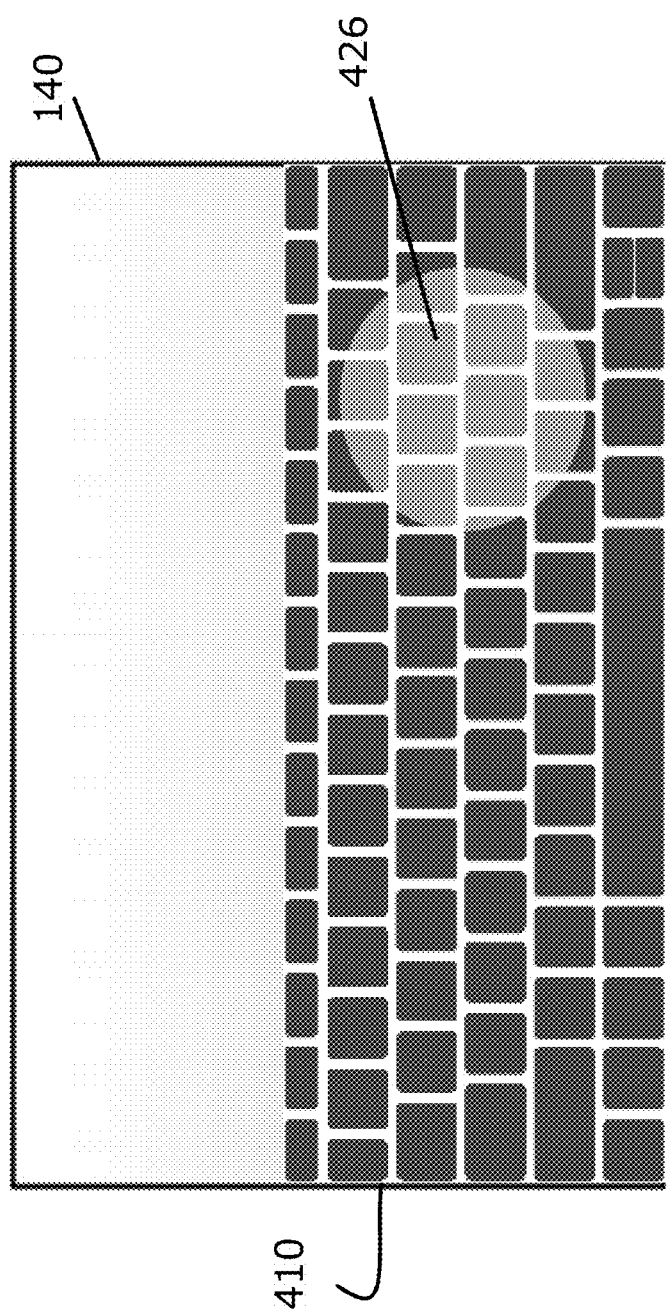
FIG. 7 is a second depiction of a touchscreen element displaying rendered content, in accordance with examples of the present disclosure.

For example, FIG. 7 depicts a touchscreen 140 displaying rendered content including a virtual keyboard 410, and a placement region 426, in accordance with an aspect of the present disclosure. The virtual keyboard 410 is a touch target. As shown in FIG. 7, the placement region 426 of the touchscreen 140 contains a first portion of the virtual keyboard 410.

Returning again to the method 500 of FIG. 5, following the operation 520, the operation 530 is next.

At the operation 530, the system deactivates the first portion of the at least one touch target.

For example, returning again to the example of FIG. 7, the system may deactivate the portion of the virtual keyboard 410 that is within the placement region 426. Notably, the remainder of the virtual keyboard 410 remains activated.

Returning again to the method 500 of FIG. 5, after the operation 530, the operation 540 is next.

At the operation 540, the system activates the virtual mouse at the first placement region.

Figure 8:
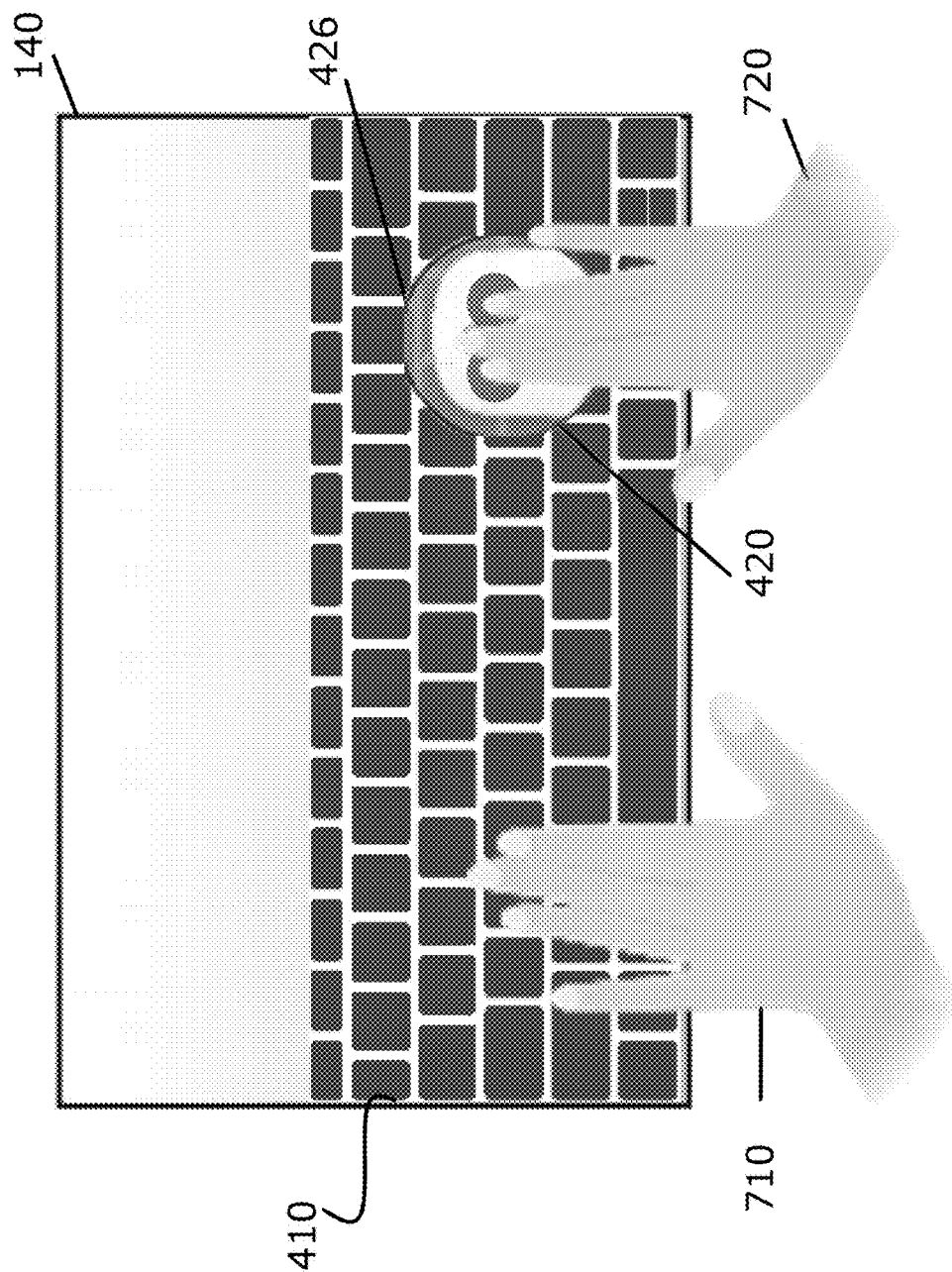
FIG. 8 is a third depiction of a touchscreen element displaying rendered content, in accordance with examples of the present disclosure.

For example, FIG. 8 is a second depiction a touchscreen 140, displaying rendered content including a virtual keyboard 410, a virtual mouse 420, a placement region 426, and a user's hands 710, 720, in accordance with an aspect of the present disclosure. The placement region 426 contains a first portion of the virtual keyboard 410. The virtual keyboard 410 is a touch target. The first portion of the virtual keyboard 410 has been deactivated, providing for the activation of the virtual mouse 420 at the placement region 426. The virtual mouse 420 is activated and is encompassed by the placement region 426, and the remainder of the virtual keyboard 410 remains activated. As shown, the right hand 720 of the user is using the virtual mouse 420 while the left hand 710 of the user is using the virtual keyboard 410, contemporaneously.

Figure 9:
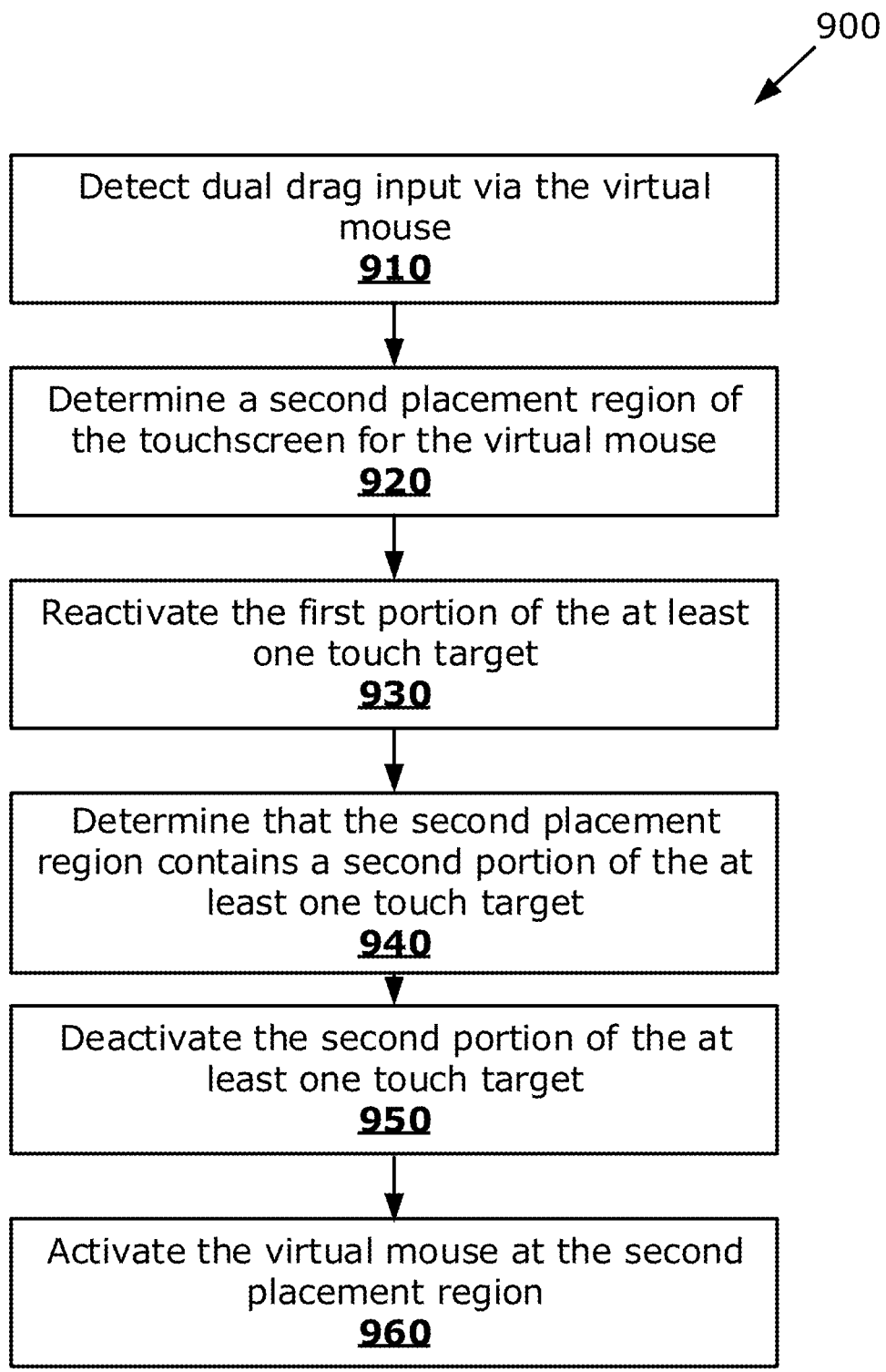
FIG. 9 is a flowchart of an example method of activating a virtual mouse, in accordance with examples of the present disclosure

FIG. 9 is a flowchart of an example method 900 for activating a virtual mouse, in accordance with an aspect of the present disclosure. The method 900 may be performed by one or more processors of a computing system (e.g., the computing system 200 of FIG. 2). Specifically, the operations 910 and onward may be performed by one or more processors of a touch screen device.

At operation 910, the system detects dual drag input via the virtual mouse. The dual drag input may correspond to a contemporaneous movement of a first finger touchscreen location and a second finger touchscreen location. In some implementations, the contemporaneous movement may comprise a movement of the first finger touchscreen location from an initial first finger touchscreen location within the first placement region to a subsequent first finger touchscreen location, and to a movement of the second finger touchscreen location from and initial second finger touchscreen location to a subsequent second finger touchscreen location.

Figure 10:
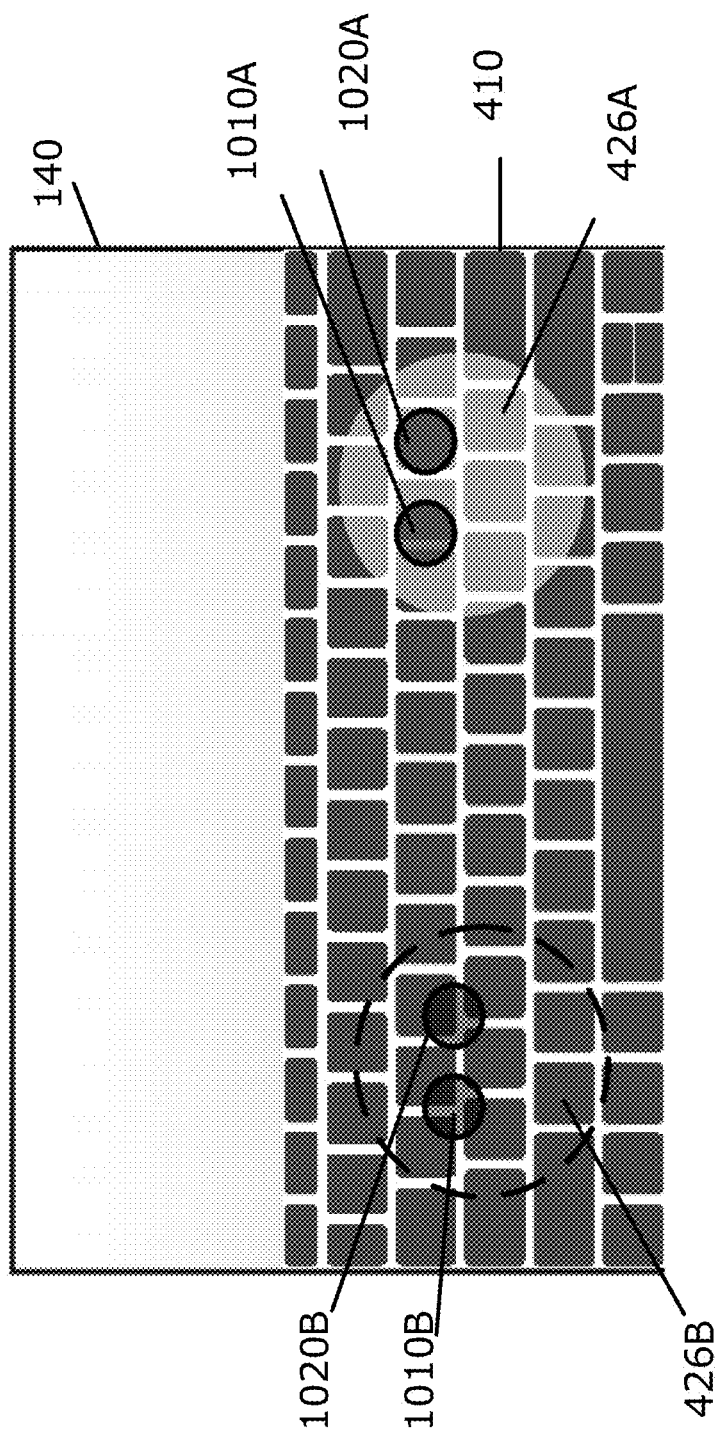
FIG. 10 is a fourth depiction of a touchscreen element displaying rendered content, in accordance with examples of the present disclosure.

Reference is now made to FIG. 10, which is a third depiction of a touchscreen 140, including a virtual keyboard 410, a representation of a first placement region 426A, a second placement region 426B, a representation of initial and subsequent first finger touchscreen locations 1010AB and initial and subsequent second finger touchscreen locations 1020AB, in accordance with an aspect of the present disclosure. The placement region 426 contains a portion of the virtual keyboard 410, and the virtual keyboard 410 is a touch target.

Initial first and second finger locations 1010A, 1020A are represented by discs upon the first placement region 426A on the right side of the virtual keyboard 410. Subsequent first and second finger locations 1010B, 1020B are represented by discs upon the second placement region 426B on left side of the virtual keyboard 410. It will be noted that in some implementations, one or more of the initial first and second finger touchscreen locations 1010A, 1020A may overlap with one or more of the subsequent first and second finger touchscreen locations 1010B, 1020B. In some implementations, the first finger location may correspond to a location of an index finger on the touchscreen 140 and the second finger location may correspond to a location of a middle finger on the touchscreen 140. The index finger and the middle finger may belong to the same hand of the user.

Returning to the method 900 of FIG. 9, after the operation 910, the operation 920 is next.

At the operation 920, the system determines a second placement region of the touchscreen for the virtual mouse. The determination may be made in a variety of ways. For example, in some implementations, the system may detect a cessation of a touch input, for example, of the dual drag input. The cessation of a touch input may refer to the cessation of a particular type of touch input, and/or of a particular touch gesture. For example, in some implementations, the system may detect that a particular type of touch input, such as a dual drag input, has ceased. In some implementations, a touch input may cease without all touch input being removed from the touchscreen. For example, a touch input that involves a change in touch location (e.g., a drag touch input) may be considered to have ceased if the touch location no longer changes (e.g., location of the touch input remains approximately the same for at least a defined period of time, such as at least 500 ms). In the example where the touch input is the dual drag input, the cessation of the dual drag input may be determined when the first and second finger locations, after having been moved from respective initial locations, become stationary for at least a defined period of time. This cessation of the dual drag input may mirror a user moving a physical mouse from an initial location to a new location, but keeping their fingers in contact with the physical mouse.

Following the detection of a cessation of a touch input, the system may determine a cessation location of the touchscreen. The cessation location of the touchscreen may be the location of the touchscreen at which the touch input was detected to have ceased (or stopped moving). The system may then determine a subsequent first finger touchscreen location and a subsequent second finger touchscreen location associated with the cessation location, and the system may determine the second placement region to correspond to the subsequent first finger touchscreen location and the subsequent second finger touchscreen location.

In some embodiments, the determination of the second placement region may include the determination of the size of the second placement region, and the size of the second placement region may vary. For example, in some implementations, the size of the second placement region may correspond to the relative position of the subsequent first finger touchscreen location and the subsequent second finger touchscreen location. For example, in some implementations, the size of the second placement region may be proportional to a distance between the subsequent first finger touchscreen location and the subsequent second finger touchscreen location. Notably, in this way, the size of the subsequent placement region may vary in accordance with the relative size of the hand of a user. As well, in this way, the size of the second placement region may be different than the size of the first placement region, and the size of the virtual mouse may vary during use.

At the operation 930, the system reactivates the first portion of the at least one touch target.

Figure 11:
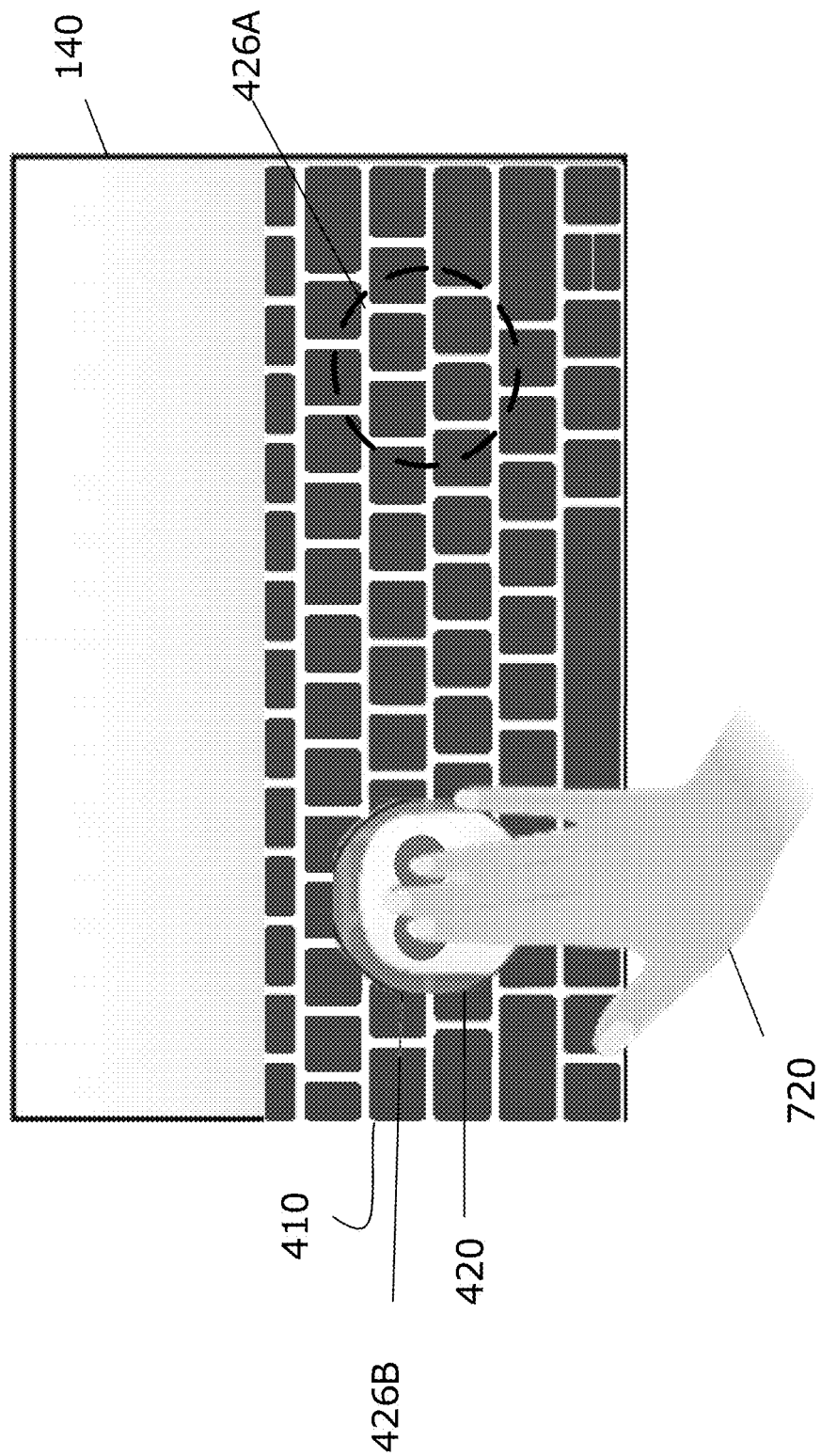
FIG. 11 is a fifth depiction of a touchscreen element displaying rendered content, in accordance with examples of the present disclosure.

Reference is made to FIG. 11, which depicts a touchscreen 140 displaying a virtual keyboard 410, a virtual mouse 420, a first placement region 426A, a second placement region 426B and a user's right hand 720. The virtual keyboard 410 is a touch element. The first placement region 426A contains a first portion of the virtual keyboard 410 and the second placement region 426B contains a second portion of the virtual keyboard 410. As compared with the depiction of FIG. 8, the virtual mouse 420 has been relocated to a second location of the virtual keyboard 410. As a result, the first placement region 426A (identified using a perforated line) has been reactivated. In this way, the first portion of the virtual keyboard 410 associated with the first placement region 426A may now be used by a user.

Returning again to the method 900 of FIG. 9, after the operation 930, the operation 940 is next.

At the operation 940, the system determines that the second placement region contains at least a portion of a touch element. A touch target is an element displayed by a touchscreen that a user may click, touch, or otherwise interact with, such as a virtual button or a virtual keyboard.

At the operation 950, the system deactivates the second portion of the at least one touch target. As previously described, a touch target is an element displayed by a touchscreen that a user may click, touch, or otherwise interact with, such as a virtual button or a virtual keyboard.

Returning again to FIG. 11 the second placement region 426B of the touchscreen 140 contains a second portion of the virtual keyboard 410. The second portion of the keyboard (the portion of the virtual keyboard 410 encompassed by the second placement region 426B) has been deactivated.

At the operation 960, the system activates the virtual mouse at the second placement region. As shown in FIG. 11, the virtual mouse 420 is activated and is encompassed by the second placement region 426B. The second portion of the virtual keyboard 410 (which is the portion of the virtual keyboard 410 encompassed by the second placement region 426B) is deactivated, and the remainder of the virtual keyboard 410 remains activated, including the first portion of the virtual keyboard 410 associated with the first placement region 426A (which has been reactivated). As shown, the right hand 720 of the user is using the virtual mouse 420 in the second placement region 426B while the remainder of the virtual keyboard 410 remains activated. It will be noted that the size of the second placement region 426B may be different than the size of the first placement region 426A, and that the size of the virtual mouse 420 at the first placement region 426A may be different than the size of the virtual mouse 420 at the second placement region 426B.

Figure 12:
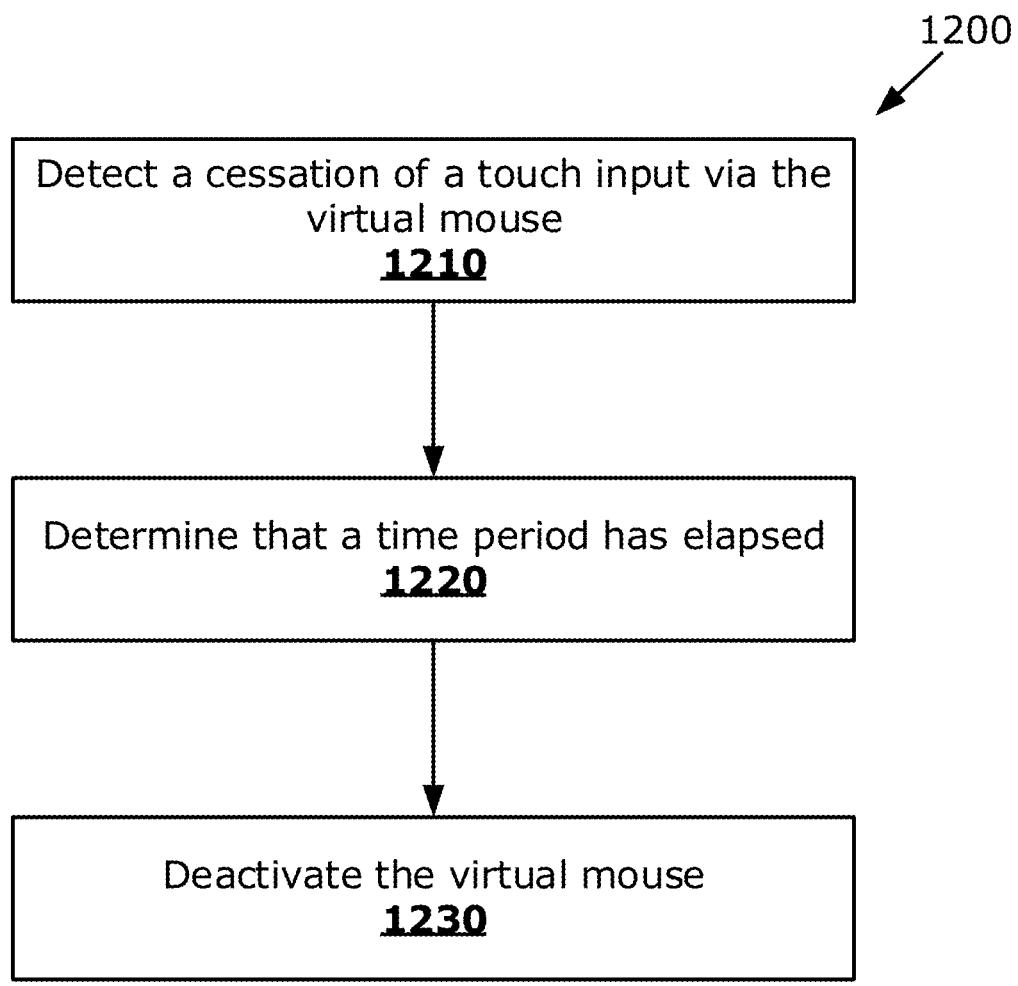
FIG. 12 is a flowchart of an example method for deactivating a virtual mouse, in accordance with examples of the present disclosure.

FIG. 12 is a flowchart of an example method 1200 for deactivating a virtual mouse, in accordance with an aspect of the present disclosure. The method 1200 may be performed by one or more processors of a computing system (such as the computing system 200 of FIG. 2). Specifically, the operations 1210 and onward may be performed by one or more processors of a touchscreen device.

At the operation 1210, the system detects a cessation of a touch input via the virtual mouse. As previously noted, the cessation of a touch input may refer to the cessation of a particular type of touch input, and/or of a particular touch gesture. For example, in some implementations, the system may detect that a particular type of touch input, such as a dual drag input, has ceased (e.g., the first and second touch locations have stopped moving). In some implementations, a touch input may cease without all touch input being removed from the touchscreen.

At the operation 1220, the system determines that a predefined time period has elapsed. The time period may be, for example, 1 second, 5 seconds or seconds or 30 seconds.

At the operation 1230, the system deactivates the virtual mouse. In some implementations, deactivating the virtual mouse may cause the virtual mouse to disappear from view, and may further cause a portion of a touch target, which was previously deactivated (e.g., due to being encompassed by a placement region surrounding the virtual mouse) to reactivate.

As noted, in some embodiments, there may be multiple ways of activating a virtual mouse. For example, the virtual mouse may be activated via the assistive widget 440 (FIG. 4), and via a multi-finger gesture on the touchscreen. In some implementations, the assistive widget 440 (FIG. 4) may also be used to activate a virtual keyboard. In some implementations, the assistive widget 440 (FIG. 4) may be operable to launch an shortcut menu, which is a menu providing means for interacting with the virtual keyboard 410, the virtual mouse 420, and other rendered content of the touchscreen 140, etc.

Figure 13:
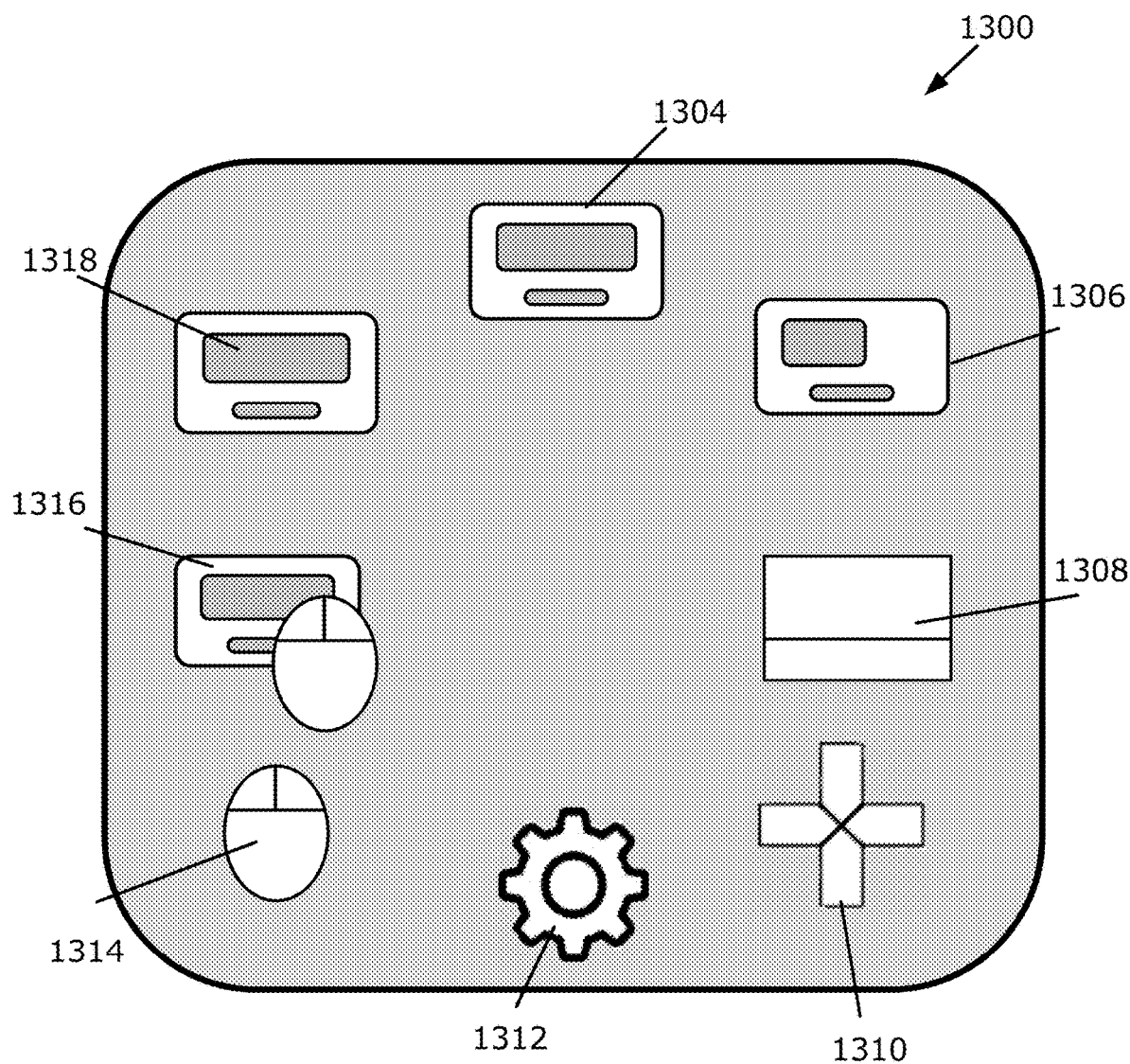
FIG. 13 is a representation of an example shortcut menu, in accordance with examples of the present disclosure.

FIG. 13 is a representation of an example shortcut menu 1300, in accordance with on aspect of the present disclosure. The shortcut menu may be activated via the assistive widget 440 (FIG. 4), for example, by executing a particular touch gesture upon the assistive widget 440 (FIG. 4). The shortcut menu 1300 is a menu which may be rendered for display on a touchscreen element 140 (FIG. 1). The shortcut menu 1300 may display a variety of touch targets, which may be shortcuts for input interaction which may provide accessibility and discoverability to pertaining to aspects of the present disclosure. The shortcut menu 1300 itself may be a touch target.

In the example shortcut menu 1300 of FIG. 13, the shortcut menu 1300 displays eight example touch targets 1304-1318 represented by icons. The eight example touch targets 1304-1318 are a standard keyboard icon 1304, a half keyboard icon 1306, a trackpad icon 1308, a custom keyboard icon 1310, a settings icon 1312, a virtual mouse icon 1314, a mouse and keyboard icon 1316, and a small keyboard icon 1318.

In some embodiments, the eight example touch targets 1304-1318 may each be operable to launch one or more applications. For example, the standard keyboard icon 1304 may be operable to launch a virtual keyboard 410 on a touchscreen 140, such as that shown in FIG. 4. The half keyboard icon 1306 may be operable to launch a virtual half keyboard on a touchscreen 140 (FIG. 4). The virtual half keyboard may be similar to the virtual keyboard 410 of FIG. 4, but may require a smaller display area of the touchscreen than the virtual keyboard 410. The trackpad icon 1308 may be operable to launch a virtual trackpad on a touchscreen 140, such as that shown in FIG. 4. The virtual trackpad may be used for pointing (controlling input positioning) on a touchscreen 140 (FIG. 4). The custom keyboard icon 1310 may be operable to launch a virtual custom keyboard on a touchscreen 140 (FIG. 4). The custom keyboard may be a virtual keyboard having a preset layout. The settings icon 1312 may be operable to launch a settings application of the OS 310 (FIG. 3) on a touchscreen 140 (FIG. 4). The virtual mouse icon 1314 may be operable to launch a virtual mouse 420, such as that shown in FIG. 4, and as described throughout the present disclosure, on a touchscreen 140, such as that shown in FIG. 4. The mouse and keyboard icon 1316 may be operable to launch both a virtual mouse 420 and a virtual keyboard 410 (FIG. 4), contemporaneously, on a touchscreen 140, such as that shown in FIG. 4.

An example outline of possible counterpart virtual mouse interactions to common physical mouse interactions for a touchscreen implementing a force sensing screen technology will now be provided. It will be noted that, hereinbelow, a "force click" refers to a stationary, single touch input while applying increased pressure, and that a "pressured drag" refers to a moving, single touch input while applying pressure.

In examples where the touch panel 244 of the touchscreen element 140 includes one or more force sensors, the touchscreen element 140 may also be referred to as a force-sensing screen. In such embodiments, a force click (i.e., a touch gesture that is sensed along with force input exceeding a force threshold) that is sensed at a first finger location while a second finger location, to the right of the first finger location, is detected in contact with the force-sensing screen may be interpreted to be equivalent to a physical mouse left click. A similar force click while a second finger location is in contact with the screen may be interpreted to be equivalent to a physical mouse right click if the second finger location is detected to the left of the first finger location. In another example, if a force click is detected at a first finger location, and the first finger location then moves while maintaining the force input (such a gesture may be referred to as a "pressured drag" gesture), this may be interpreted to be equivalent to a physical mouse drag. If a second finger location is also detected during the pressured drag gesture, the location of the second finger location (i.e., whether detected to the left or to the right of the pressured drag gesture) may be used to determine whether the pressured drag gesture is equivalent to a physical mouse drag while holding a left mouse button or a right mouse button. In another example, if a first finger location is detected to be below a force threshold (i.e., a touch gesture rather than a force gesture) while a second finger location is detected to be stationary, this may be interpreted to be equivalent to a physical mouse scroll wheel input. In another example, a force click that is detected at both a first and a second finger location may be interpreted to be equivalent to a physical mouse middle click.

In examples where the touch panel 244 of the touchscreen element 140 includes one or more resistive sensors, the touchscreen element 140 may also be referred to as a resistive touch screen. In such embodiments, a single tap (i.e., a touch gesture that is sensed for a short duration of time) that is sensed at a first finger location while a second finger location, to the right of the first finger location, is detected in contact with the resistive screen may be interpreted to be equivalent to a physical mouse left click. A similar single tap while a second finger location is in contact with the screen may be interpreted to be equivalent to a physical mouse right click if the second finger location is detected to the left of the first finger location. In another example, if a double tap (i.e., a touch gesture that consists of two single taps detected in close succession) is detected at a first finger location, and the first finger location then moves while maintaining contact (i.e., performing a touch drag gesture), this may be interpreted to be equivalent to a physical mouse drag. If a second finger location is also detected during the touch drag gesture, the location of the second finger location (i.e., whether detected to the left or to the right of the touch drag gesture) may be used to determine whether the touch drag gesture is equivalent to a physical mouse drag while holding a left mouse button or a right mouse button. In another example, if a first finger location is detected while a second finger location is detected to be stationary, this may be interpreted to be equivalent to a physical mouse scroll wheel input. In another example, a single tap that is detected at both a first finger location and a second finger location at the same time may be interpreted to be equivalent to a physical mouse middle click.

In examples where the touch panel 244 of the touchscreen element 140 includes one or more capacitive sensors, the touchscreen element 140 may also be referred to as a capacitive touch screen. Capacitive touch screens may be capable of distinguishing between a hard tap and a soft tap. In such embodiments, a single hard tap that is sensed at a first finger location while a second finger location, to the right of the first finger location, is detected in contact with the capacitive touch screen may be interpreted to be equivalent to a physical mouse left click. A similar hard tap while a second finger location is in contact with the screen may be interpreted to be equivalent to a physical mouse right click if the second finger location is detected to the left of the first finger location. In another example, if a hard tap is detected at a first finger location, and the first finger location then moves while maintaining contact (i.e., performing a touch drag gesture), this may be interpreted to be equivalent to a physical mouse drag. If a second finger location is also detected during the touch drag gesture, the location of the second finger location (i.e., whether detected to the left or to the right of the touch drag gesture) may be used to determine whether the touch drag gesture is equivalent to a physical mouse drag while holding a left mouse button or a right mouse button. In another example, if a first finger location is detected while a second finger location is detected to be stationary, this may be interpreted to be equivalent to a physical mouse scroll wheel input. In another example, a hard tap that is detected at both a first finger location and a second finger location at the same time may be interpreted to be equivalent to a physical mouse middle click.

The present disclosure has described examples of a virtual mouse having a minimal touchscreen footprint, and which may be operated contemporaneously with a larger touch target occupying at least part of the same touchscreen location. The larger touch target may be, for example, a virtual keyboard.

Examples disclosed herein have described the efficient, single-handed, user-initiated control and maintenance of the virtual mouse directly via the touchscreen, without requiring the use of a separate physical device. The present disclosure has further described a virtual mouse that provides system level cursor control, and that may be operated globally, across multiple applications, providing a system level solution that is not application specific.

The present disclosure has described a virtual mouse which may dynamically adapt to the size of a user's hand, providing additional ease of use.

Furthermore, an assistive widget has been described herein. The assistive widget may provide for the activation and deactivation of the virtual mouse and/or other virtual input devices in a manner that is accessible to the neophyte.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable an electronic device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer system comprising:
a touchscreen;
a processor; and
a memory coupled to the processor, the memory storing instructions which, when executed by the processor, cause the system to:

deactivate a first portion of an at least one touch target;

activate a virtual mouse at a first placement region of the touchscreen for the virtual mouse, wherein the first placement region contains the first portion of the at least one touch target;

detect dual drag input via the virtual mouse, the dual drag input corresponding to a contemporaneous movement of a first finger touchscreen location and a second finger touchscreen location, the contemporaneous movement comprising a movement of the first finger touchscreen location from an initial first finger touchscreen location within the first placement region to a subsequent first finger touchscreen location, and to a movement of the second finger touchscreen location from an initial second finger touchscreen location within the first placement region to a subsequent second finger touchscreen location;

determine a second placement region of the touchscreen for the virtual mouse, the second placement region corresponding to the subsequent first finger touchscreen location and the subsequent second finger touchscreen location;

reactivate the first portion of the at least one touch target; and activate the virtual mouse at the second placement region.

2. The system of claim 1, wherein the system is further caused to:
prior to activating the virtual mouse at the second placement region, determine that the second placement region contains a second portion of the at least one touch target; and
deactivate the second portion of the at least one touch target.

3. The system of claim 1, the system is further caused to:
detect a multi-finger gesture at an initial first finger touchscreen location and an initial second finger touchscreen location; and
determine that the first placement region corresponds to the initial first finger touchscreen location and the initial second finger touchscreen location.

4. The system of claim 3 wherein the first placement region for the virtual mouse encompasses the initial first finger touchscreen location and the initial second finger touchscreen location.

5. The system of claim 4, wherein a size of the first placement region is proportional to a distance between the initial first finger touchscreen location and the initial second finger touchscreen location.

6. The system of claim 5, wherein a size of the virtual mouse at the first placement region is proportional to the size of the first placement region.

7. The system of claim 1, wherein the at least one touch target is a virtual keyboard.

8. The system of claim 1, wherein the system is further caused to:
detect a cessation of a touch input via the virtual mouse;
determine that a time period has elapsed; and
deactivate the virtual mouse.

9. The system of claim 1, wherein the touchscreen displays an assistive widget, and wherein the system is further caused to:
detect a single finger drag of the assistive widget;
determine that the assistive widget has reached an edge region of the touchscreen; and
responsive to determining that the assistive widget has reached the edge region of the touchscreen, determine the first placement region to be at a default location.

10. The system of claim 9, wherein the system is further caused to: detect a touch input via the assistive widget; and
in response to detecting the touch input via the assistive widget, deactivate the virtual mouse.

11. A method for providing a virtual mouse on a touchscreen, the touchscreen displaying at least one touch target, the method comprising:
deactivating a first portion of an at least one touch target;
activating the virtual mouse at a first placement region of the touchscreen for the virtual mouse, wherein the first placement region contains the first portion of the at least one touch target;
detecting dual drag input via the virtual mouse; the dual drag input corresponding to a contemporaneous movement of a first finger touchscreen location and a second finger touchscreen location, the contemporaneous movement comprising a movement of the first finger touchscreen location from an initial first finger touchscreen location within the first placement region to a subsequent first finger touchscreen location, and to a movement of the second finger touchscreen location from an initial second finger touchscreen location within the first placement region to a subsequent second finger touchscreen location;
determining a second placement region of the touchscreen for the virtual mouse, the second placement region corresponding to the subsequent first finger touchscreen location and the subsequent second finger touchscreen location;
reactivating the first portion of the at least one touch target; and
activating the virtual mouse at the second placement region.

12. The method of claim 11, further comprising:
prior to activating the virtual mouse at the second placement region, determining that the second placement region contains a second portion of the at least one touch target; and
deactivating the second portion of the at least one touch target.

13. The method of claim 11, further comprising:
detecting a multi-finger gesture at the initial first finger touchscreen location and the initial second finger touchscreen location; and
determining that the first placement region corresponds to the initial first finger touchscreen location and the initial second finger touchscreen location.

14. The method of claim 11, wherein the first placement region surrounds the initial first finger touchscreen location and the initial second finger touchscreen location.

15. The method of claim 14, wherein a size of the first placement region is proportional to a distance between the initial first finger touchscreen location and the initial second finger touchscreen location.

16. The method of claim 15, wherein a size of the virtual mouse at the first placement region is proportional to the size of the first placement region.

17. The method of claim 11, wherein the at least one touch target is a virtual keyboard.

18. A non-transitory computer-readable medium having machine-executable instructions stored thereon, the machine-executable instructions, when executed by a processor of a device, cause the device to:
deactivate a first portion of an at least one touch target;

activate the virtual mouse at a first placement region of the touchscreen for a virtual mouse, wherein the first placement region contains the first portion of the at least one touch target;

detect dual drag input via the virtual mouse, the dual drag input corresponding to a contemporaneous movement of a first finger touchscreen location and a second finger touchscreen location, the contemporaneous movement comprising a movement of the first finger touchscreen location from an initial first finger touchscreen location within the first placement region to a subsequent first finger touchscreen location, and to a movement of the second finger touchscreen location from an initial second finger touchscreen location within the first placement region to a subsequent second finger touchscreen location;

determine a second placement region of the touchscreen for the virtual mouse, the second placement region corresponding to the subsequent first finger touchscreen location and the subsequent second finger touchscreen location;

reactivate the first portion of the at least one touch target; and activate the virtual mouse at the second placement region.

19. The method of claim 11, further comprising:

detecting a cessation of a touch input via the virtual mouse;

determining that a time period has elapsed; and deactivating the virtual mouse.

20. The method of claim 11, wherein the touchscreen displays an assistive widget, the method further comprising:

detecting a single finger drag of the assistive widget;

determining that the assistive widget has reached an edge region of the touchscreen; and responsive to determining that the assistive widget has reached the edge region of the touchscreen, determining the first placement region to be at a default location.

* * * * *